(12) United States Patent
Tsutsue et al.

(10) Patent No.: US 6,579,649 B2
(45) Date of Patent: *Jun. 17, 2003

(54) POLYMER ELECTROLYTE BATTERY

(75) Inventors: Makoto Tsutsue, Kadoma (JP); Kazushige Kinoshita, Hirakata (JP); Akiko Ishida, Moriguchi (JP); Ken Nishimura, Osaka (JP); Masahiko Ogawa, Takarazuka (JP); Nobuo Eda, Hirakata (JP)

(73) Assignee: Matsushita Electric Industrial Co., Ltd., Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,914

(22) Filed: Feb. 9, 1999

(65) Prior Publication Data

US 2002/0006548 A1 Jan. 17, 2002

(30) Foreign Application Priority Data

| Feb. 18, 1998 | (JP) | 10-036136 |
| Feb. 18, 1998 | (JP) | 10-036148 |
| Feb. 18, 1998 | (JP) | 10-036150 |
| Feb. 19, 1998 | (JP) | 10-036992 |
| Aug. 31, 1998 | (JP) | 10-245643 |
| Aug. 31, 1998 | (JP) | 10-245656 |
| Aug. 31, 1998 | (JP) | 10-245669 |
| Sep. 4, 1998 | (JP) | 10-250736 |

(51) Int. Cl.$^7$ .......... H01M 6/18; H01M 4/60; H01M 4/62; H01M 4/58
(52) U.S. Cl. .......... 429/309; 429/213; 429/217; 429/231.8; 429/231.95; 429/304
(58) Field of Search .............. 429/213, 217, 429/231.8, 231.9, 304, 309, 231.95

(56) References Cited

U.S. PATENT DOCUMENTS

| 4,830,939 A | 5/1989 | Lee et al. |
| 4,853,305 A | 8/1989 | Anderman et al. |
| 5,344,724 A | * 9/1994 | Ozaki et al. ............ 429/94 |
| 5,418,091 A | 5/1995 | Gozdz et al. |
| 5,456,000 A | 10/1995 | Gozdz et al. |
| 5,478,668 A | 12/1995 | Gozdz et al. |
| 5,489,492 A | * 2/1996 | Asami et al. ............ 429/212 |
| 5,540,741 A | 7/1996 | Gozdz et al. |
| 5,571,634 A | 11/1996 | Gozdz et al. |
| 5,587,253 A | 12/1996 | Gozdz et al. |
| 5,654,114 A | * 8/1997 | Kubota et al. ............ 429/218 |
| 5,677,084 A | * 10/1997 | Tsukamoto et al. ....... 429/218 |
| 5,707,763 A | * 1/1998 | Shimizu et al. .......... 429/217 |
| 5,922,493 A | * 7/1999 | Humphrey, Jr. et al. ... 429/316 |
| 5,951,959 A | * 9/1999 | Nishimura ............. 423/447.1 |

FOREIGN PATENT DOCUMENTS

| EP | 0 730 316 A1 | 9/1996 |
| EP | 0 803 925 A1 | 10/1997 |
| JP | 5-290833 | 11/1993 |
| JP | 10189053 | 7/1998 |
| WO | WO 97/43795 A1 | 11/1997 |
| WO | WO 99/19924 A1 | 4/1999 |

* cited by examiner

Primary Examiner—Patrick Ryan
Assistant Examiner—Julian Mercado
(74) Attorney, Agent, or Firm—Akin Gump Strauss Hauer & Feld L.L.P.

(57) ABSTRACT

Disclosed is a polymer electrolyte battery affording a high capacity density in which a layer of electrode active material mixture containing a polymer has an adequately regulated porosity and/or polymer content. The battery includes a unitary, laminated battery sheet composed of a negative electrode combined with positive electrodes, with a porous polymer separator being placed on both surfaces of the negative electrode. Each of the electrodes comprises a current collector and a layer of active material mixture disposed on both surfaces of the current collector, and the polymer is capable of absorbing and retaining nonaqueous electrolyte. The separator and the layer of electrode active material mixture have a porosity of 30 to 60%. Preferable polymer contents in the layer of active material mixture are in a range of 5 to 10 wt % for the positive electrode and in a range of 7 to 16 wt % for the negative electrode.

10 Claims, 13 Drawing Sheets

POLYMER ELECTROLYTE BATTERY

BACKGROUND OF THE INVENTION

The present invention relates to a polymer electrolyte battery, particularly to a flat polymer electrolyte battery comprising a thermally unitary laminated structure composed of electrode films or sheets and separator films or sheets, the electrodes and separators containing a polymer capable of absorbing and retaining a nonaqueous electrolyte.

With the recent development of compact, thin and lightweight portable appliances, there has been a strong demand for a compact, thin and lightweight battery as a power source therefor. Lightweight lithium ion batteries affording a high energy density have already been realized, much contributing to down-sizing and weight reduction of portable phones and portable personal computers. However, there is still an ever-increasing serious demand for further minimized lightweight portable appliances. However, conventional lithium ion batteries realizing a short distance between positive and negative electrodes and a satisfactory contact between the electrode and a separator by tightly securing a laminate of the positive and negative electrodes and the separator inside a rigid and firm metal jacket case have the following drawback: A certain thickness is required for the metal jacket case in order to secure its strength, which limits realization of a thinner lithium ion battery.

One noted method for realizing a thin lithium ion battery is lithium polymer secondary batteries including a polymeric material as the electrolyte. Among them, a battery system wherein an electrolyte layer and electrodes are unitarily bound to each other is effective in realizing a thin battery system, because-it can provide a satisfactory contact between the electrolyte layer and the electrodes without need of the above-mentioned rigid and firm metal jacket case. Examples of a battery comprising a unitary bound structure of an electrolyte layer and electrodes can be found in the U.S. Pat. Nos. 4,830,939 and 5,478,668.

The U.S. Pat. No. 4,830,939 discloses a lithium battery wherein a mixed solution of a monomer and an electrolyte is applied onto the negative electrode made of metallic lithium or the positive electrode, which is then irradiated with ultraviolet ray or electron beam to polymerize the monomer and eventually form a solid polymer electrolyte. Since the layer of the electrolyte is formed along the fine uneven surface of the electrode, the contact between the electrode and the electrolyte layer becomes satisfactory without securing the one to the other.

The U.S. Pat. No. 5,478,668, on the other hand, discloses a copolymer (hereinafter referred to as "P(VDF/HFP)") of vinylidene fluoride (hereinafter referred to as "VDF") and hexafluoropropylene (hereinafter referred to as "HFP") as a polymer material. A positive electrode, a negative electrode and a polymer separator are formed first and then the separator is unitarily laminated to the positive or the negative electrode.

The use of such unitary bound sheet-like structure of an electrode and an electrolyte layer as the power generating element as disclosed in the above-mentioned two U.S. patents can give a thin rechargeable battery even when it is housed in a jacket case of a thin and flexible laminate sheet.

In order to obtain a battery which can give an operational battery capacity, this type of battery was initially formed in multiplexed-cell structure by simply piling a multiplicity of cells, each cell being formed, using a pair of positive and negative current collectors, by placing a positive electrode sheet and a negative electrode sheet to face each other, with a polymer separator being placed therebetween. The positive electrode sheet comprises a current collector and a layer of positive active material mixture disposed on one surface of current collector and the negative electrode sheet comprises a current collector and a layer of negative active material mixture disposed on one surface of the current collector. This structure, however, produces a drawback that the surface of current collector not in contact with the active material mixture fails to participate in the event of discharge, which in turn increases the percentage of the current collectors in the battery volume, compared to the conventional lithium ion battery.

In order to solve the above-mentioned problems, there is a recently proposed structure of a battery in the Japanese Laid-Open Patent Publication Hei 10-189053 such that a negative electrode whose porous current collector has a layer of negative active material mixture on both surfaces is sandwiched between positive electrodes whose porous current collector has a layer of positive active material mixture on one surface or both surfaces, with a polymer separator interposed therebetween. This structure facilitates realization of a thin and lightweight battery of high energy density while retaining satisfactory characteristics as a battery.

Specific production process of such polymer electrolyte battery is shown below:

First, a paste is prepared from a mixture of an electrode active material powder and a conductive agent powder added with an organic solvent solution of a polymer and dibutyl phthalate as a pore forming material. The resultant paste is applied onto both surfaces of a porous current collector for the negative electrode and one or both surfaces of another porous current collector for the positive electrode. Those two electrode sheets are then dried to evaporate the organic solvent, which gives a positive electrode sheet and a negative electrode sheet. The positive and negative electrode sheets thus obtained and polymer separator sheets containing a pore forming material are laminated alternately in the order of positive electrode sheet, separator, negative electrode sheet, separator and positive electrode sheet. The resultant laminate is pressed under heat, which gives a unitary, laminated sheet for use as a battery element. The battery element sheet is then immersed in, for example, an extracting solvent diethyl ether for removing the pore forming material from the sheet. After the battery element sheet becomes porous enough and has pores by this treatment, a nonaqueous electrolyte is allowed to impregnate into the pores of the electrode sheet and the polymer separator sheet.

In the polymer electrolyte battery thus obtained, the capacity density depends on the porosity and the ratio of polymer of the electrodes. This means that if the loading or packing density of electrode active material is increased by rolling the electrode sheet after applying the above-noted paste onto the current collector to reduce the degree of porosity, the electrolyte would not enter the electrode sufficiently. As a result, the utilization of electrode active material decreases. To the contrary, if the total spatial volume inside the electrode is increased by lowering the loading density of electrode active material and the porosity is increased, the electrolyte enters the electrode sufficiently. This increases the utilization of electrode active material but reduces the absolute volume of active material. Higher percentages of polymer in the electrode result in relative reductions of the volume of active material and lower percentages result in impaired electrode strength. When the percentage of polymer in the electrode is high, the polymer becomes rubbery upon stirring to make it into paste, which disturbs sufficient rolling of the electrode. Furthermore, the use of a lathe sheet as the porous current collector may not increase the loading density of electrode active material, because the current collector is stretched together with the electrode active material mixture and is even torn or pulled off during rolling. To the contrary, a low percentage of polymer in the paste interferes with thermally unitarily laminating the electrode sheets and separators, forming a gap between the electrode and the separator and elevating the internal resistance of the resultant battery. Therefore, stable performance cannot be expected for such battery. Based on the above considerations, the adequate percentage of polymer in the layer of electrode active material mixture has been conventionally 20 wt % or so.

BRIEF SUMMARY OF THE INVENTION

In view of the above-mentioned problems, the object of the present invention is to provide a thin and lightweight polymer electrolyte battery of high capacity density by optimizing the porosity of electrode sheet using a certain range of concentration of polymer in the layer of electrode active material mixture and/or by optimizing the polymer content by regulating to a fixed extent rolling operation for adjusting the porosity of electrode sheet, thereby increasing the loading density of electrode active material mixture.

The present invention provides a polymer electrolyte battery including:

a nonaqueous electrolyte, positive and negative electrode films or sheets each of which comprises a porous current collector and a layer of active material mixture disposed on both surfaces of the porous current collector, the layer of active material mixture containing a polymer capable of absorbing and retaining the electrolyte, and porous separator films of a polymer capable of absorbing and retaining the electrolyte, the electrolyte being retained in the positive and negative electrodes and the separators, wherein the positive electrodes are unitary laminated on the negative electrode with the separator being placed on both surfaces of the negative electrode to form a unitary laminated battery element sheet, and wherein the separator and the layer of active material mixture of the positive and negative electrodes have a porosity in a range of 30 to 60%.

For this battery, a preferred porosity of the layer of active material mixture is in a range of 35 to 55% for the positive electrode and in a range of 35 to 45% for the negative electrode. A preferred porosity of the separator is in a range of 50 to 55%.

The porosity of the layer of active material mixture is represented as follows:

(Total spatial volume of the layer of active material mixture)/(total volume of the layer of active material mixture)×100 (%).

The present invention also provides a polymer electrolyte battery comprising a nonaqueous electrolyte, positive and negative electrode films or sheets whose porous current collector has a layer of active material mixture containing a polymer on both surfaces, and porous separators of a polymer, each polymer being capable of absorbing and retaining the electrolyte, the electrolyte being retained in the positive and negative electrodes and the separators, wherein the positive electrodes are opposed to the negative electrode with the separator being placed on both surfaces of the negative electrode to form a unitary laminated battery element sheet, and wherein the layer of active material mixture contains the polymer in a range of 5 to 10 wt % for the positive electrode and in a range of 7 to 16 wt % for the negative electrode.

For this battery, it is more preferable that the layer of active material mixture contains the polymer in a range of 6 to 8 wt % for the positive electrode and in a range of 8 to 15% for the negative electrode.

The present invention provides a further polymer electrolyte battery whose polymer content in the layer of active material mixture is in a range of 5 to 10 wt % for the positive electrode and in a range of 7 to 16 wt % for the negative electrode and whose separator and layer of active material mixture have a porosity in a range of 35 to 55%.

For this battery, it is preferable that the layer of active material mixture has a porosity in a range of 35 to 55% for the positive electrode and a porosity in a range of 35 to 45% for the negative electrode, and contains the polymer in a range of 6 to 8 wt % for the positive electrode and in a range of 8 to 15 wt % for the negative electrode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
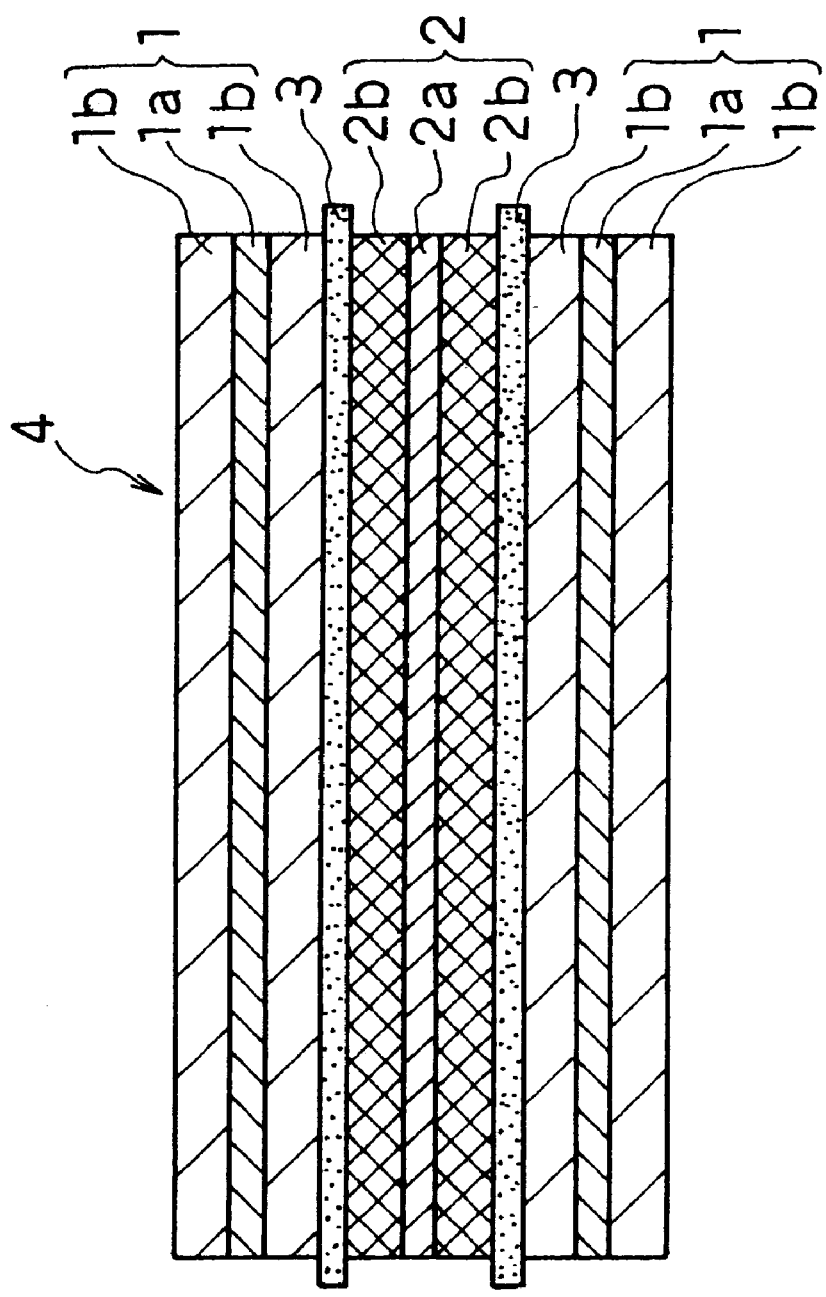
FIG. 1 is a diagrammatic longitudinal cross-sectional sketch showing a battery element of a polymer electrolyte battery in accordance with the present invention.

An example of the polymer electrolyte battery in accordance with the present invention will be described with reference to FIG. 1.

A positive electrode sheet 1 is produced as follows: First, a paste of a positive active material mixture is prepared by mixing and kneading an organic solvent solution of a polymer and a compatible plasticizer for the polymer as a pore forming material with a mixture of a powder of a positive active material and a powder of a conductive agent. The resultant paste is applied onto both surfaces of a porous current collector 1a and dried to form a layer of positive active material mixture 1b. Then, the collector 1a is rolled with a pressure roller and cut into a sheet of a predetermined size. Next, a negative electrode sheet 2 is produced as follows: A paste of a negative active material mixture is prepared by mixing and kneading an organic solvent solution of a polymer and a compatible plasticizer for the polymer as a pore forming material with a mixture of a powder of a negative active material and a powder of a conductive agent. The resultant paste is applied onto both surfaces of a porous current collector 2a and dried to form a layer of negative active material mixture 2b. Then, the collector is rolled with a pressure roller and cut into a sheet of a predetermined size. In this way, electrode films or sheets with a thickness of 250 to 450 μm can be produced. A separator 3 is a polymer sheet with a thickness of 20 to 70 μm containing a compatible plasticizer for the polymer as a pore forming material. Each of the layer of active material mixture 2b on the negative electrode sheet 2 is opposed to the layer of active material mixture 1b on the positive electrode sheet 1 with a separator being placed therebetween and formed into a laminated sheet. The laminated sheet is then heat-treated to form a unitary laminated battery element sheet 4. The pore forming material is then extracted to make the polymer porous in order to form a number of pores into which an electrolyte can be permeated. When 2 or more pieces of battery element sheet 4 are laminated, a polymer electrolyte battery affording a desired capacity can be obtained.

When a polymer electrolyte battery is produced in the above-mentioned process, it is preferable to regulate the porosity of the layer of electrode active material mixture by the degree of rolling treatment with a pressure roller. Another method for regulating the porosity of the layer of electrode active material mixture is to control the ratio of the pore forming material to the polymer. The porosity, which is dependent on the amount of pore forming material, is necessary for permeating and retaining the electrolyte in the battery element. If the ratio of the polymer to the electrode active material is fixed, the ratio of the pore forming material to the polymer is also fixed.

As such, there are two supposed methods for regulating the porosity: (1) Regulation by the degree of rolling with a pressure roller and (2) Regulation by the ratio of the pore forming material. In the method (1), rolling in greater degrees deforms or destroys polymer particles. As a result, the pores formed after removal of pore forming material have only small sizes and the overall porosity becomes small. To the contrary, rolling in lesser degrees may not deform or destroy polymer particles. As a result, the pores formed after removal of pore forming material have large sizes and the overall porosity becomes large. In the method (2), on the other hand, smaller ratios of the pore forming material form only a small number of pores, decreasing the overall porosity. Greater ratios form a great number of pores, increasing the overall porosity. In fact, the porosity is determined by regulating both the degree of rolling and the ratio of the pore forming material. In either case, if the obtained electrode sheet has a small porosity, permeation of the electrolyte into the electrode becomes insufficient, reducing the discharge capacity particularly at high-rate discharge. On the other hand, if the obtained electrode sheet has a large porosity, it increases in thickness when it is loaded with an active material in the same amount. This results in a longer distance between the discharge side of the electrode and the current collector, reducing the discharge capacity. Moreover, since such electrode may be increased in volume, volume efficiency also decreases. If the thickness is the same, the relative ratio of the active material decreases, rendering the absolute battery discharge capacity smaller. Furthermore, excess porosity reduces the mechanical strength of the electrode sheet, leading to impaired cycle characteristics as a battery.

The present invention is based on the discovery of an optimal range of porosity for the layer of active material mixture and for the separator from an experiment to regulate the degree of rolling in producing the layer of active material mixture and the separator using a constant polymer content and a constant ratio of the pore forming material, considering that the number and size of pores which are determinants of porosity are dependent on the two factors (1) amount of the pore forming material and (2) loading density in the layer of active material mixture.

In order to have a battery affording a large capacity density, it is preferable for the layer of electrode active material mixture to have a smallest polymer content. Larger polymer contents produce various inconveniences such that the electrode active material mixture becomes rubbery, hindering sufficient rolling of the electrode, or current collector is rolled together with the active material mixture and torn off. On the other hand, smaller polymer contents disturb binding by heating the electrode film or sheet to the separator to form a unitary laminated sheet, producing a gap between the electrode and the separator. A battery including such an element sheet is increased in internal resistance and fails to exhibit stable performance.

The present inventions is also based on another discovery of an optimal range of the polymer content in the layer of active material mixture of the positive and negative electrodes from an experiment to reduce the polymer content in the layer of electrode active material mixture compared to conventionally used contents in order to find optimal conditions for binding by heating the electrode and the separator into a unitary laminated sheet and realize stable battery performance. It must be noticed that the amount of the electrolyte was ignored in calculating polymer content.

In the above-mentioned method for producing the polymer electrolyte battery in accordance with the present invention, an optimal polymer content was determined from the values of loading capacity observed in the electrodes produced by varying polymer contents but fixing the amount of the active material mixture constituting an electrode and the polymer/pore forming material ratio, and the values of discharge capacity and internal resistance observed in the batteries including such electrodes. In this case, the weight ratio of the pore forming material to the polymer is preferably in a range of 1 to 2.

According to the present invention, a polymer electrolyte battery of further greater capacity density can be obtained with the use of an electrode whose polymer content and porosity have been optimized, because performance of the above-mentioned electrode and battery is largely affected by the two factors, porosity and polymer content in the layer of the electrode active material mixture.

In the present invention, although a copolymer of VDF and HFP, that is, P(VDF/HFP), is a preferred polymer for use in the electrode and separator, the polymer is not limited to such copolymer, and any of polymers which can absorb and retain a nonaqueous electrolyte and can work as a binder for binding an active material to the current collector and for binding electrode sheets and separator sheets to each other is also applicable. In the present invention, the pore forming material is not limited to dibutyl phthalate.

The polymer electrolyte used in the present invention is the so-called solid polymer electrolyte, particularly gel-type solid polymer electrolyte. Details of applicable polymer, plasticizer and nonaqueous electrolyte can be found in the U.S. Pat. No. 5,418,091 and the above-mentioned U.S. Pat. No. 5,478,668 (which are incorporated herein by reference in their entirety).

As the positive active material, a compound such as $LiCoO_2$, $LiNiO_2$ or $LiMn_2O_4$ that can reversibly intercalate and deintercalate lithium upon discharge and charge, particularly a lithiated transition metal oxide is used.

As the negative active material, a carbon material or something like that is used which can reversibly intercalate and deintercalate lithium upon charge and discharge. Graphite is a particularly desired material in order to obtain a high capacity battery. A preferred graphite material is a spheric graphite powder with a mean particle size of 6 to 50 $\mu$m prepared by carbonizing and graphitizing a carbonaceous mesophase particle. A more preferred material is a spheric graphite powder in which the interplanar spacing is 3.365 to 3.390 angstroms and the crystal size is 200 to 650 angstroms along the c axis by X-ray diffractometry, and the $I_{1360}/I_{1580}$ ratio of the peak intensity $I_{1360}$ at 1360 $cm^{-1}$ to the peak intensity $I_{1580}$ at 1580 $cm^{-1}$ by argon laser-Raman spectrometry is in a range of 0.20 to 0.40.

As the positive current collector, a perforated plate, lathe sheet or net of aluminum, titanium, stainless steel or the like, or something like that is used. As the negative current collector, a perforated plate, lathe sheet or net of copper, stainless steel or the like, or something like that is used. When the polymer electrolyte battery is formed to have the multiplexed-cell structure as mentioned before, it is preferable to use a perforated porous sheet having non-perforated margin for the electrodes, in consideration of subsequent attachment of the respective lead terminal.

The nonaqueous electrolyte may be one arbitrarily selected from among various conventionally known combinations for use in polymer electrolyte battery, for example, a combination of a solute, such as $LiClO_4$, $LiBF_4$, $LiPF_6$, $LiCF_3SO_3$ or the like with a solvent, such as ethylene carbonate, propylene carbonate, ethyl methyl carbonate, dimethoxyethane or the like.

In a preferred mode of the present invention, the polymer should be a VDF/HFP copolymer (P(VDF/HFP) and the electrode active material should contain a carbonaceous conductive agent such as carbon black and have a polymer content in a range of 5 to 16 wt % and a porosity in a range of 30 to 60%. In consideration of battery characteristics, particularly charge/discharge cycle life characteristic, the polymer content in the positive active material mixture is more preferably in a range of 5 to 10 wt % and the porosity is more preferably in a range of 35 to 55% when an oxide as exemplified above is employed as the positive active material. On the other hand, it is more preferable for the negative active material mixture to contain the polymer in a range of 7 to 16 wt % and have a porosity in a range of 35 to 45% when it includes the above-noted spheric graphite powder.

In the following, the present invention will be described more specifically by way of concrete examples.

EXAMPLE 1

100 g of P(VDF/HFP)(HFP ratio=12 wt %) and 50 g of silica powder ($SiO_2$) were mixed in 500 g acetone to produce a silica-dispersed solution. To the resultant solution, 150 g of dibutyl phthalate (hereinafter referred to as "DBP") was added and dissolved. The silica-dispersed solution containing DBP was applied onto a glass plate and dried to evaporate acetone, which gave a separator film of 300 $\mu$m thick. The film was cut into a separator sheet of 40 mm×60 mm.

Separately, 90 g of P(VDF/HFP) was dissolved in 1,500 g acetone into which 900 g of $LiCoO_2$, 50 g of acetylene black and 135 g of DBP were mixed and kneaded to make a paste. The paste thus obtained was applied onto both surfaces of an aluminum lathe sheet of 40 $\mu$m thick serving as a positive current collector and dried. The dried sheet was then rolled under pressure to produce a positive electrode sheet of 100 $\mu$m thick. The sheet was then cut into a sheet of 35 mm×55 mm for use as the positive electrode.

Similarly, 120 g of P(VDF/HFP) was dissolved in 1,000 g acetone into which 750 g of a spheric graphite powder with a mean particle size of 20 $\mu$m (manufactured by Osaka Gas Co. Ltd., Osaka, Japan) prepared by carbonizing and graphitizing a carbonaceous mesophase particle, 60 g of a graphite fiber as a conductive agent (manufactured by Osaka Gas Co. Ltd., Osaka, Japan), and 180 g of DBP were mixed and kneaded to make a paste. The graphite fiber was prepared by graphitizing a carbon fiber obtained by vapor phase epitaxy. The paste thus obtained was applied onto both surfaces of a copper lathe sheet of 50 $\mu$m thick serving as a negative current collector and dried. The dried sheet was then rolled under pressure to produce a negative electrode sheet of 300 $\mu$m thick. The sheet was then cut into a sheet of 35 mm×55 mm for use as the negative electrode.

The positive and negative current collectors used in the present invention were preformed on the respective surfaces with a conductive carbon coating film. The film was formed by applying a dispersion of acetylene black in a 12 wt % N-methy-2-pyrrolidone solution of polyvinylidene fluoride and drying the resultant at 80° C. or more.

The negative electrode sheet thus obtained was disposed on both surfaces with the positive electrode sheet, with the separator film being placed therebetween. The resultant combination was passed through a pair of pressure rollers preheated to 150° C. to press and bind it into a unitary laminated sheet for use as a battery element. The battery element sheet was then immersed in an extracting solvent diethyl ether to remove DBP and make the polymer porous. The resultant porous sheet was dried in a vacuum at 50° C.

and immersed in an electrolyte under reduced pressure for predetermined hours to permeate the electrolyte into the pores and the polymer inside the electrodes and the separator. The electrolyte used here is 1 mol/l $LiPF_6$ in a solvent mixture of ethylene carbonate and ethyl methyl carbonate at a volumetric ratio of 1:3.

The battery element sheet thus obtained was mounted with a laminate film prepared by inserting an aluminum film between two resin films which gave a battery of 0.6 mm thick and 40 mm×60 mm.

In this battery, the porosity was 45% in the layer of active material mixture of the positive electrode, 40% in that of the negative electrode, and 53% in the separator. The polymer content excluding the amount of electrolyte was 8.7 wt % in the layer of active material mixture of the positive electrode, 12.9 wt % in that of the negative electrode, and 66 wt % in the separator. Although the above-mentioned separator has a porosity of 53%, a preferable separator has a porosity in a range of 50 to 55% in consideration of electrolyte retention and ionic conductivity of the resultant battery.

Next, batteries 1 to 7 with a fixed porosity of 40% for the layer of negative active material mixture and different porosities for the layer of positive active material mixture were produced. For comparison, batteries 8 to 14 with a fixed porosity of 45% for the layer of positive active material mixture and different porosities for the layer of negative active material mixture were also produced. Table 1 lists the porosity of the positive and negative electrodes in those 14 battery samples.

TABLE 1

| Battery sample | Porosity of positive electrode (%) | Porosity of negative electrode (%) |
| --- | --- | --- |
| Battery 1 | 25 | 40 |
| Battery 2 | 35 | 40 |
| Battery 3 | 40 | 40 |
| Battery 4 | 45 | 40 |
| Battery 5 | 50 | 40 |
| Battery 6 | 55 | 40 |
| Battery 7 | 70 | 40 |
| Battery 8 | 45 | 23 |
| Battery 9 | 45 | 30 |
| Battery 10 | 45 | 35 |
| Battery 11 | 45 | 40 |
| Battery 12 | 45 | 45 |
| Battery 13 | 45 | 52 |
| Battery 14 | 45 | 65 |

The batteries were compared for their battery characteristics in the following manner and the results will be described.

Figure 2:
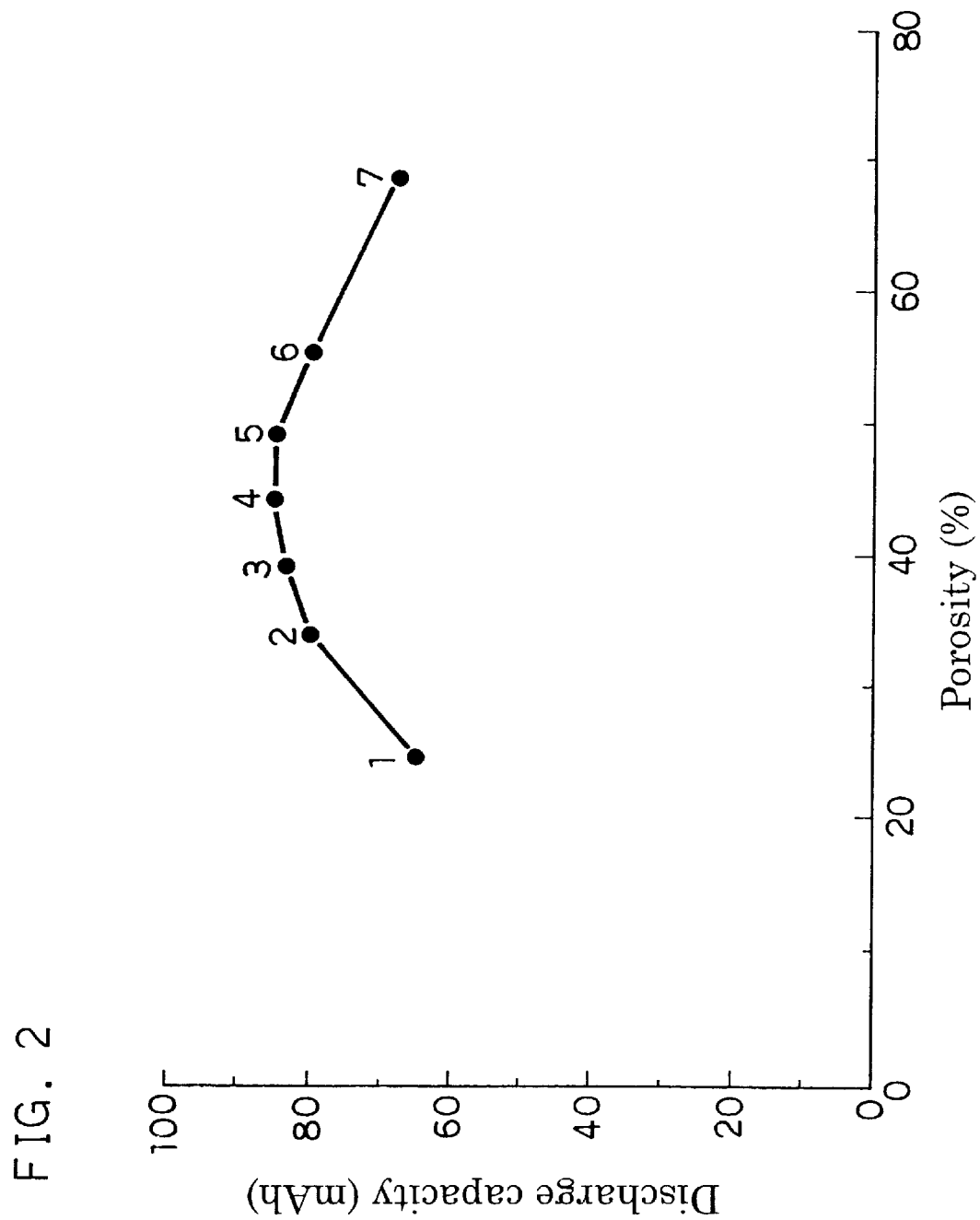
FIG. 2 is a graph illustrating changes in discharge capacity observed in polymer electrolyte batteries in accordance with the present invention which have different porosity for the layer of positive active material mixture and constant porosity for the layer of negative active material mixture.
Figure 3:
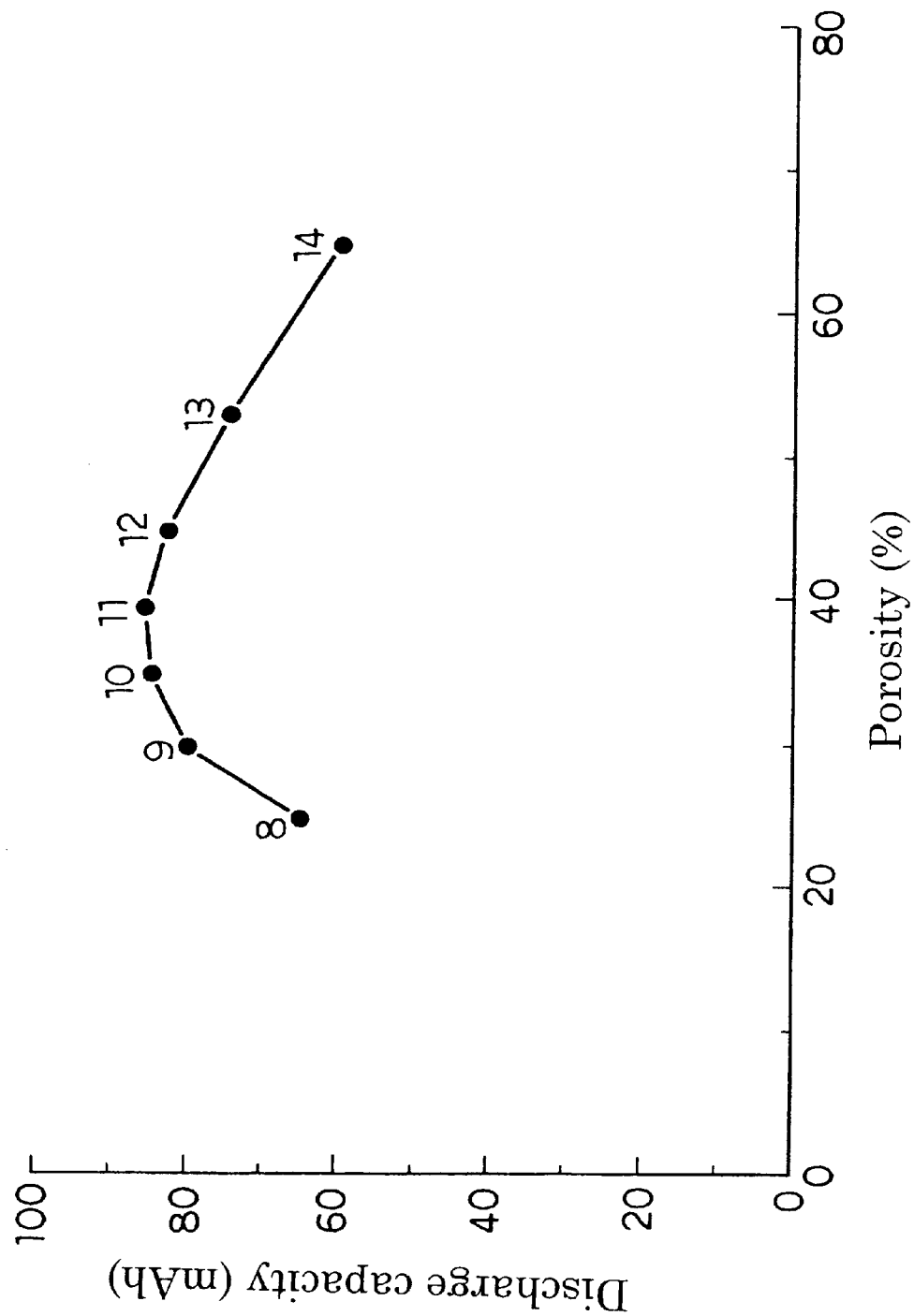
FIG. 3 is a graph illustrating changes in discharge capacity observed in polymer electrolyte batteries in accordance with the present invention which have different porosity for the layer of negative active material mixture and constant porosity for the layer of positive active material mixture.

First, batteries 1 to 7 were discharged at a rate of 0.2 C. until the terminal voltage decreased to 3.0 V to determine the discharge capacity of each battery which results are shown in FIG. 2. In the figure, abscissa represents the porosity in the layer of positive active material mixture in each battery. Batteries 8 to 14 were tested similarly and the results are shown in FIG. 3.

As evident from the data shown in the two figures, the battery discharge capacity varies greatly by the porosity of the layer of active material mixture despite the use of the same amount of the active material.

Positive and negative electrodes having a porosity in the range of 30 to 60% can give a satisfactory capacity characteristic to the respective batteries including those electrodes. More particularly, positive electrodes having a porosity of 35 to 55% and negative electrodes having a porosity of 35 to 45% can produce a capacity of 80 mAh (corresponding to active material utilization 80%) or more, and thus are more preferable.

Figure 4:
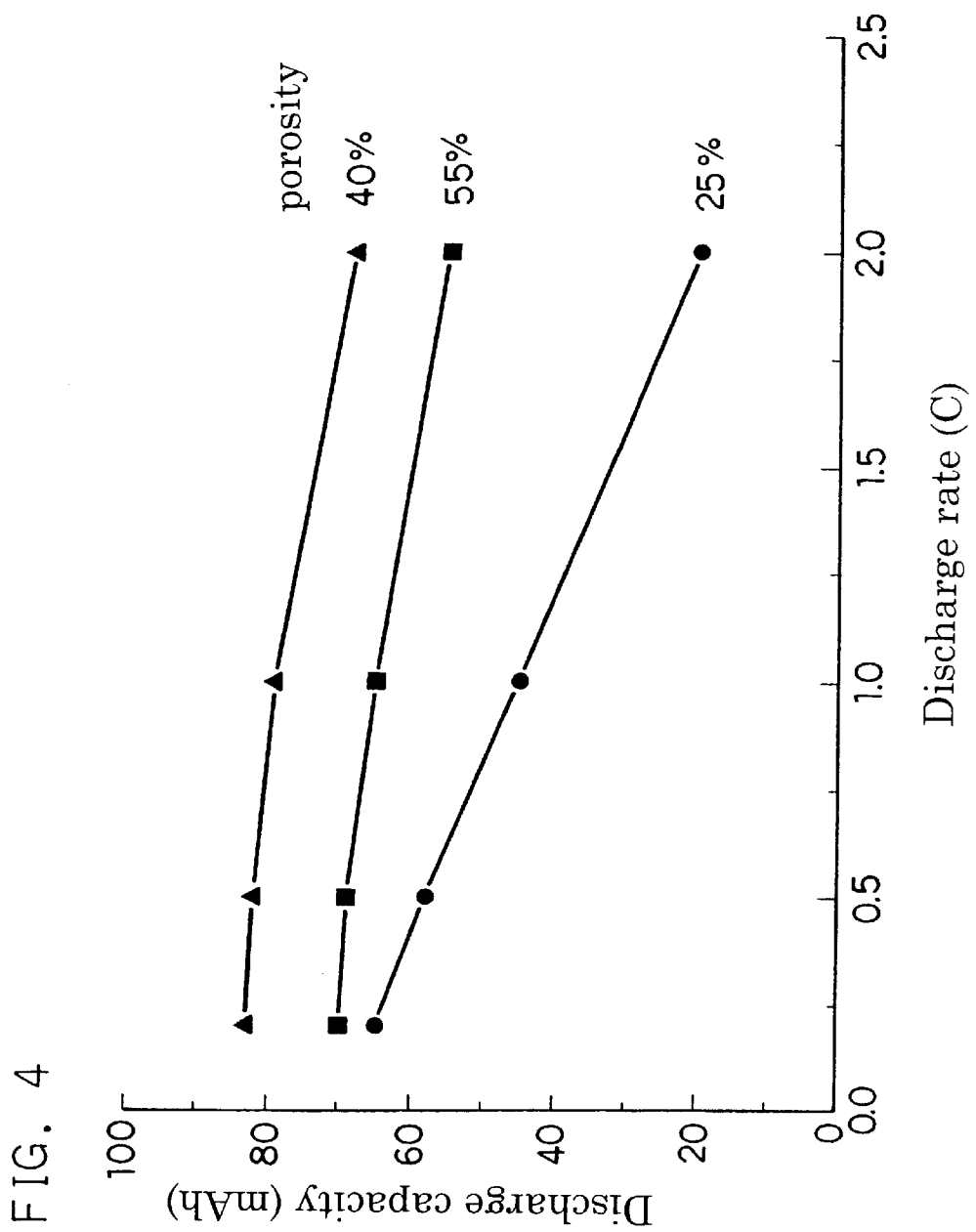
FIG. 4 is a graph illustrating the relationship between the discharge rate and discharge capacity observed in batteries with different porosity for the layer of positive active material mixture.
Figure 5:
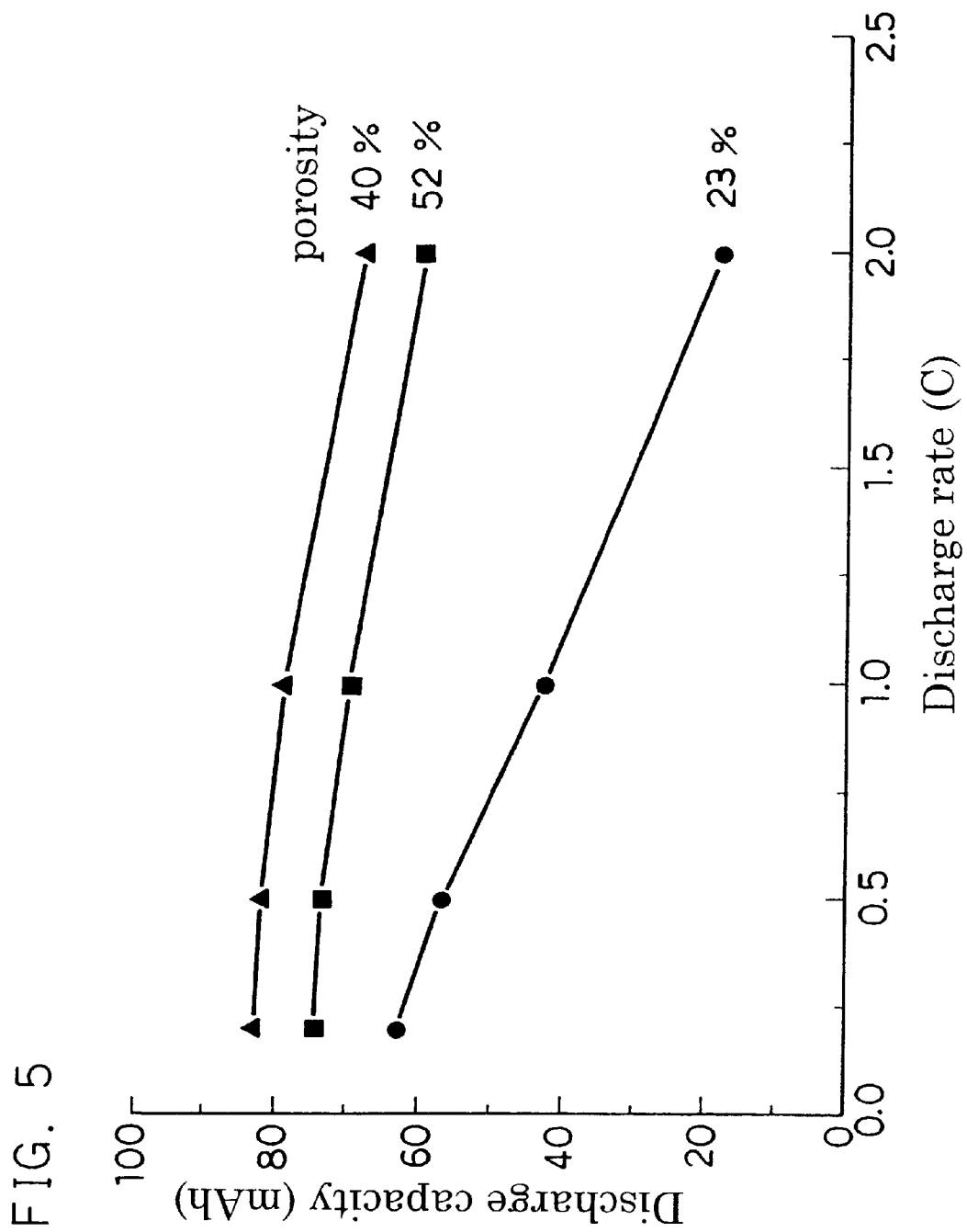
FIG. 5 is a graph illustrating the relationship between the discharge rate and discharge capacity observed in batteries with different porosity for the layer of negative active material mixture.

Then, batteries 1, 3 and 6 in the former group and batteries 8, 11 and 13 in the latter group were discharged at different discharge rates. FIG. 4 shows the relationship between the discharge rate and discharge capacity in batteries 1, 3 and 6 with different porosity for the positive electrode. FIG. 5 shows the relationship between the discharge rate and discharge capacity in batteries 8, 11 and 13 with different porosity for the negative electrode. These figures clearly indicate that batteries including an electrode active material with inadequate porosity can not produce a discharge capacity in correspondence with the loaded amount of the active material irrespective of discharge rate.

EXAMPLE 2

Following the procedure in Example 1, positive electrodes 15 to 23 were produced, except that polymer (P(VDF/HFP)) content in the layer of positive active material mixture was changed, and batteries 15 to 23 including the resultant electrodes 15 to 23 were produced. Similarly, negative electrodes 24 to 33 were produced, except that polymer (P(VDF/HFP)) content in the layer of negative active material mixture was changed, and batteries 24 to 33 including the resultant electrodes 24 to 33 were produced. Tables 2 and 3 list the polymer contents in the battery samples 15 to 33 thus obtained. In producing batteries of Example 2, the ratio of DBP to the polymer P(VDF/HFP) was fixed at 1.5.

TABLE 2

| Battery sample | Polymer content in positive electrode (wt %) |
| --- | --- |
| Battery 15 | 2 |
| Battery 16 | 4 |
| Battery 17 | 5 |
| Battery 18 | 6 |
| Battery 19 | 7 |
| Battery 20 | 8 |
| Battery 21 | 10 |
| Battery 22 | 15 |
| Battery 23 | 25 |

TABLE 3

| Battery sample | Polymer content in negative electrode (wt %) |
| --- | --- |
| Battery 24 | 5 |
| Battery 25 | 6 |
| Battery 26 | 7 |
| Battery 27 | 8 |
| Battery 28 | 9 |
| Battery 29 | 10 |
| Battery 30 | 12 |
| Battery 31 | 15 |
| Battery 32 | 16 |
| Battery 33 | 25 |

The electrodes and the batteries thus produced were compared for their characteristics, and the results will be described.

Figure 6:
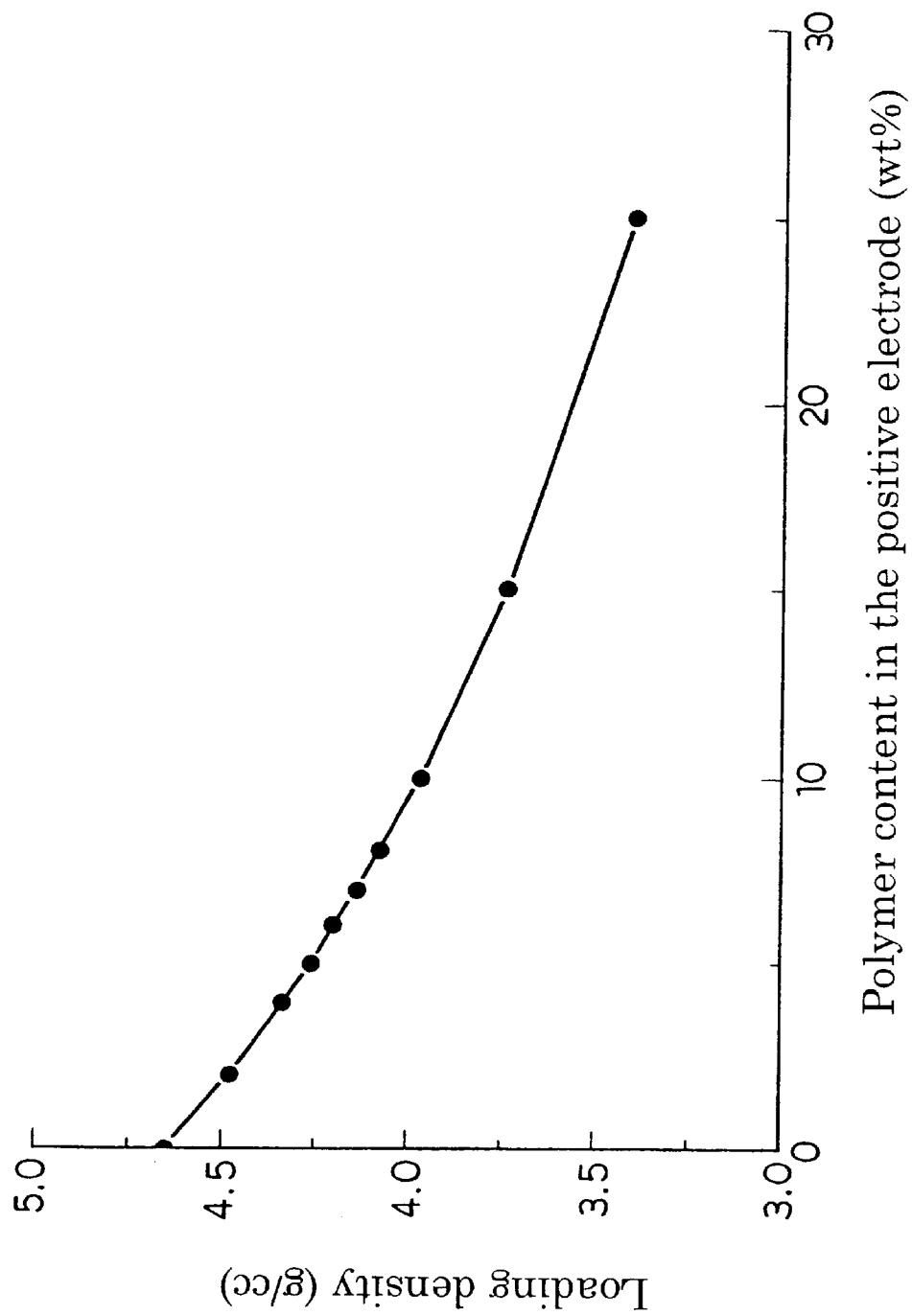
FIG. 6 is a graph illustrating the relationship between the polymer content and loading density of active material mixture in the positive electrode.
Figure 7:
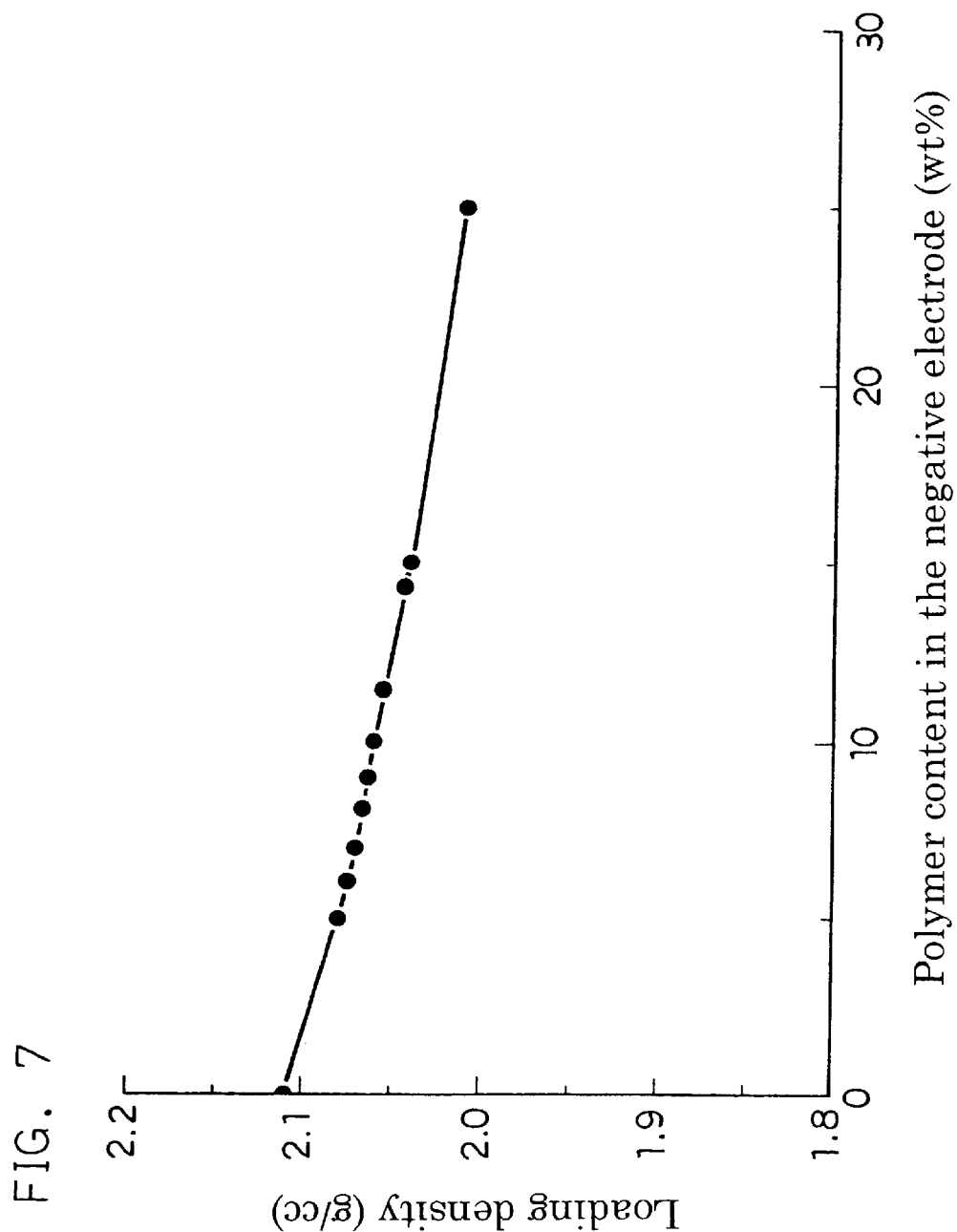
FIG. 7 is a graph illustrating the relationship between the polymer content and loading density of active material mixture in the negative electrode.

First, the relationship between the polymer content in the layer of the active material mixture and loading density of the active material in the positive electrode is shown in FIG. 6 and the relationship between the polymer content in the layer of the active material mixture and loading density of the active material in the negative electrode is shown in FIG. 7.

Figure 8:
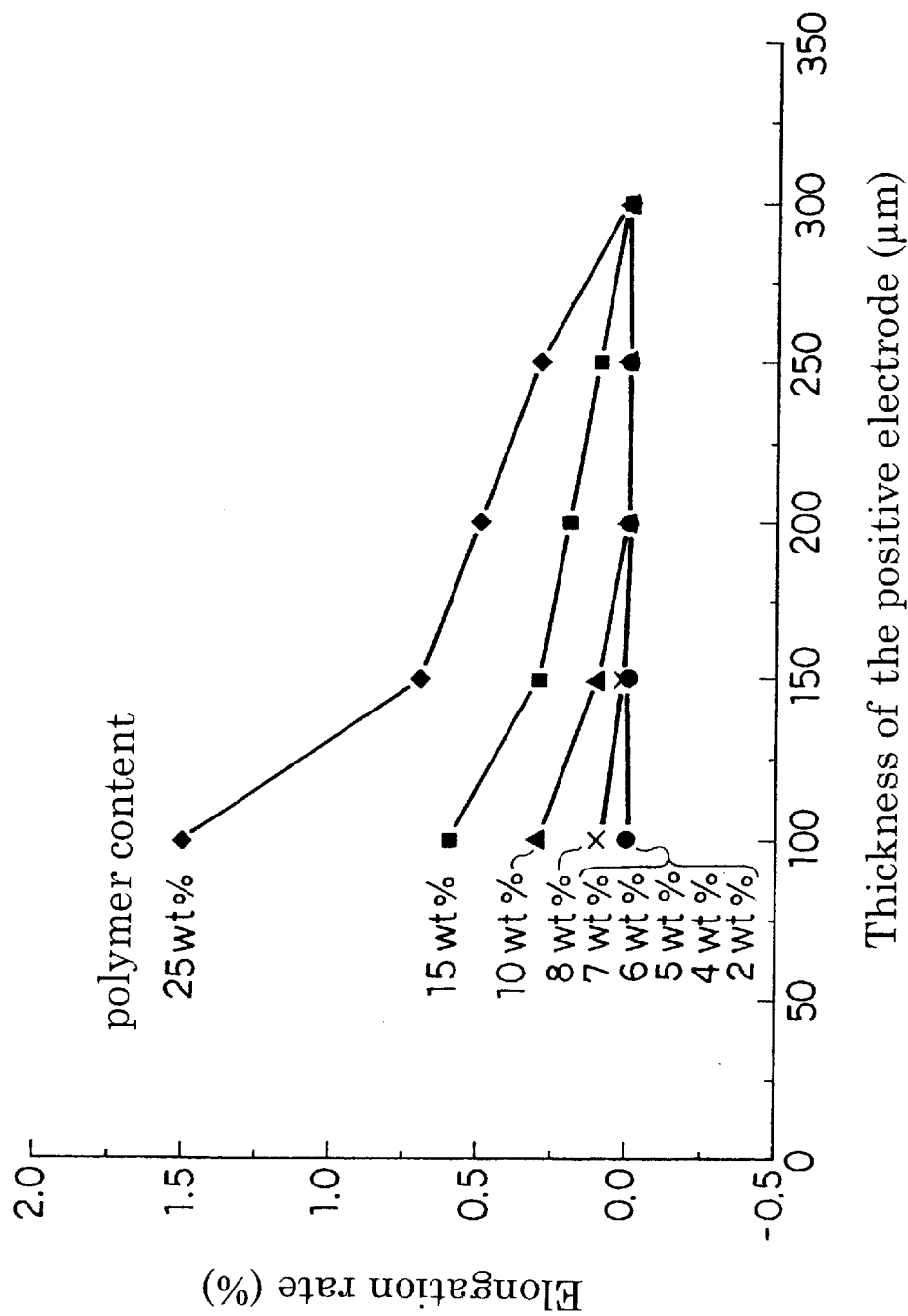
FIG. 8 is a graph illustrating the relationship between the thickness and elongation (stretch) rate of electrode sheet observed at production of positive electrodes with different polymer contents.
Figure 9:
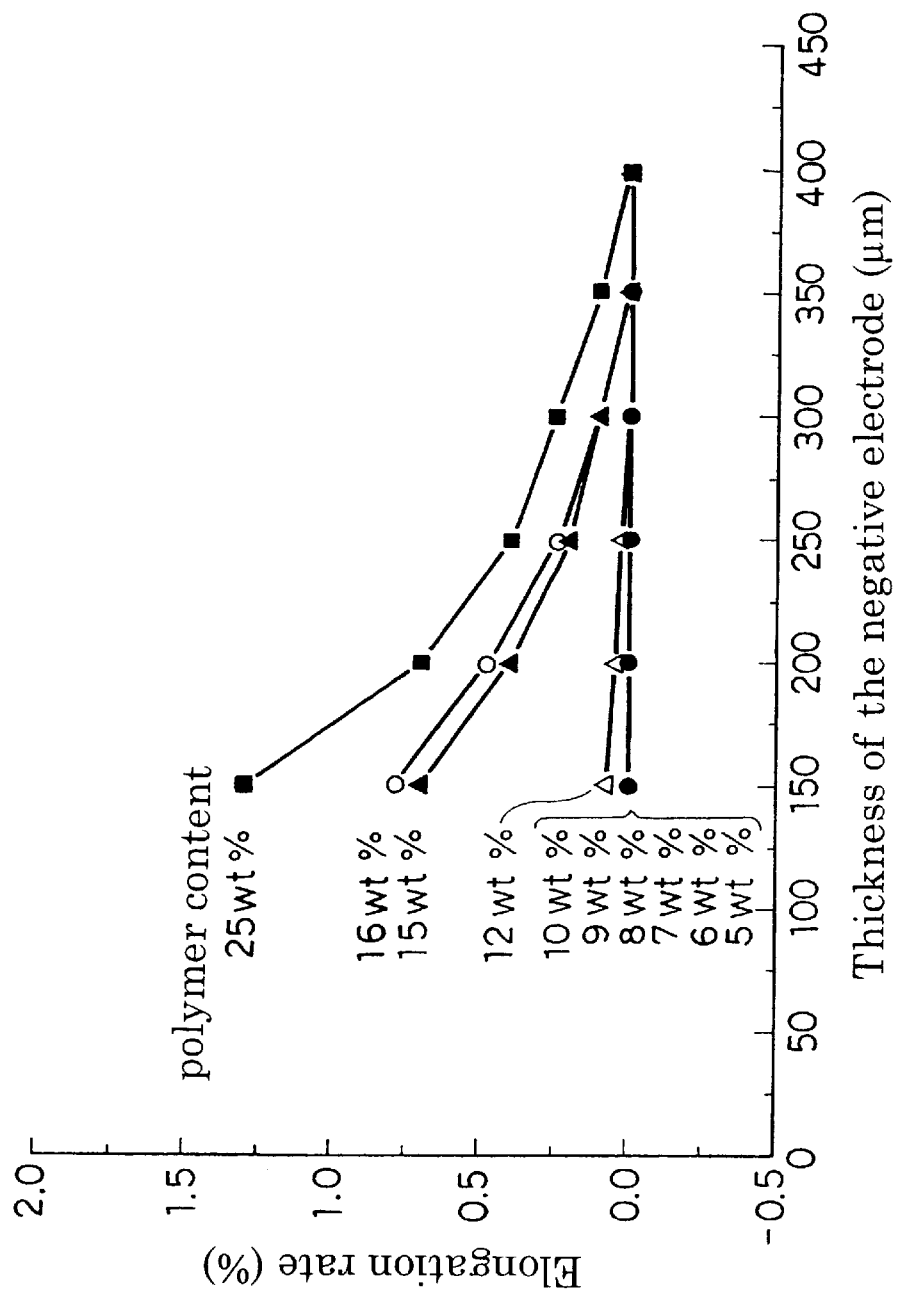
FIG. 9 is a graph illustrating the relationship between the thickness and elongation (stretch) rate of electrode sheet observed at production of negative electrodes with different polymer contents.

FIG. 8 and FIG. 9 respectively illustrate the elongation (stretch) rate of electrode sheet during rolling under pressure at production of positive electrodes 15 to 23 and negative electrode 24 to 33.

As apparent from the two graphs, the positive and negative electrodes decrease in loading density in the layer of the active material mixture with increases in polymer content. Increased polymer content enhances elongation rate of the sheet upon rolling the electrode under pressure. When electrode sheets are pressed to increase their active material loading density, the polymer in the sheets may manifest its intrinsic rubbery property in excess if the polymer content is too high, elongating the current collector before it is formed into a thin electrode sheet by sufficiently pressing the layer of the active material mixture. Therefore, excess polymer content disturbs production of thin electrodes and thus lowers the loading density of the active material. The resultant battery, therefore, cannot have expected high capacity.

Figure 10:
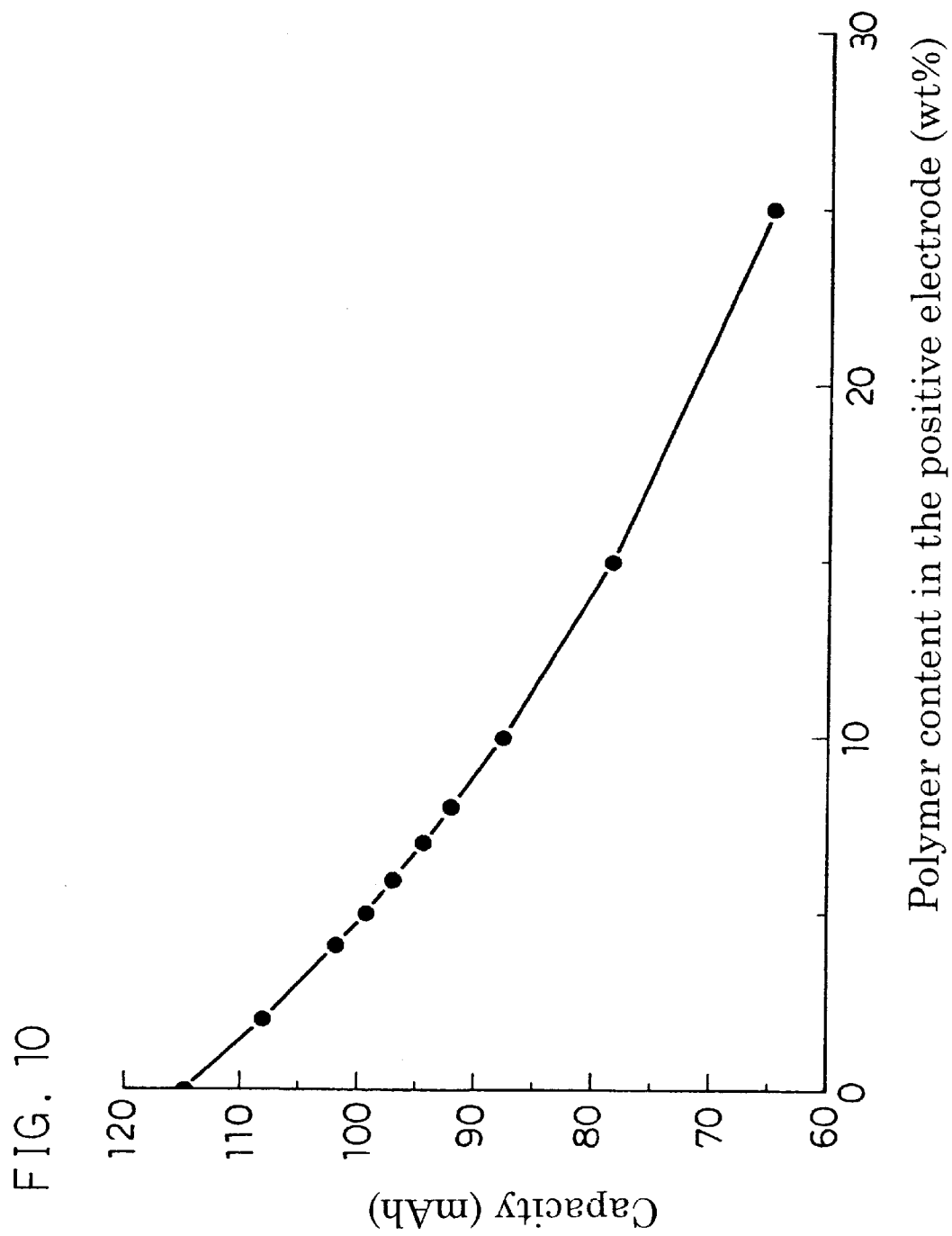
FIG. 10 is a graph illustrating the relationship between the polymer content in the positive electrode and discharge capacity of the resultant battery.
Figure 11:
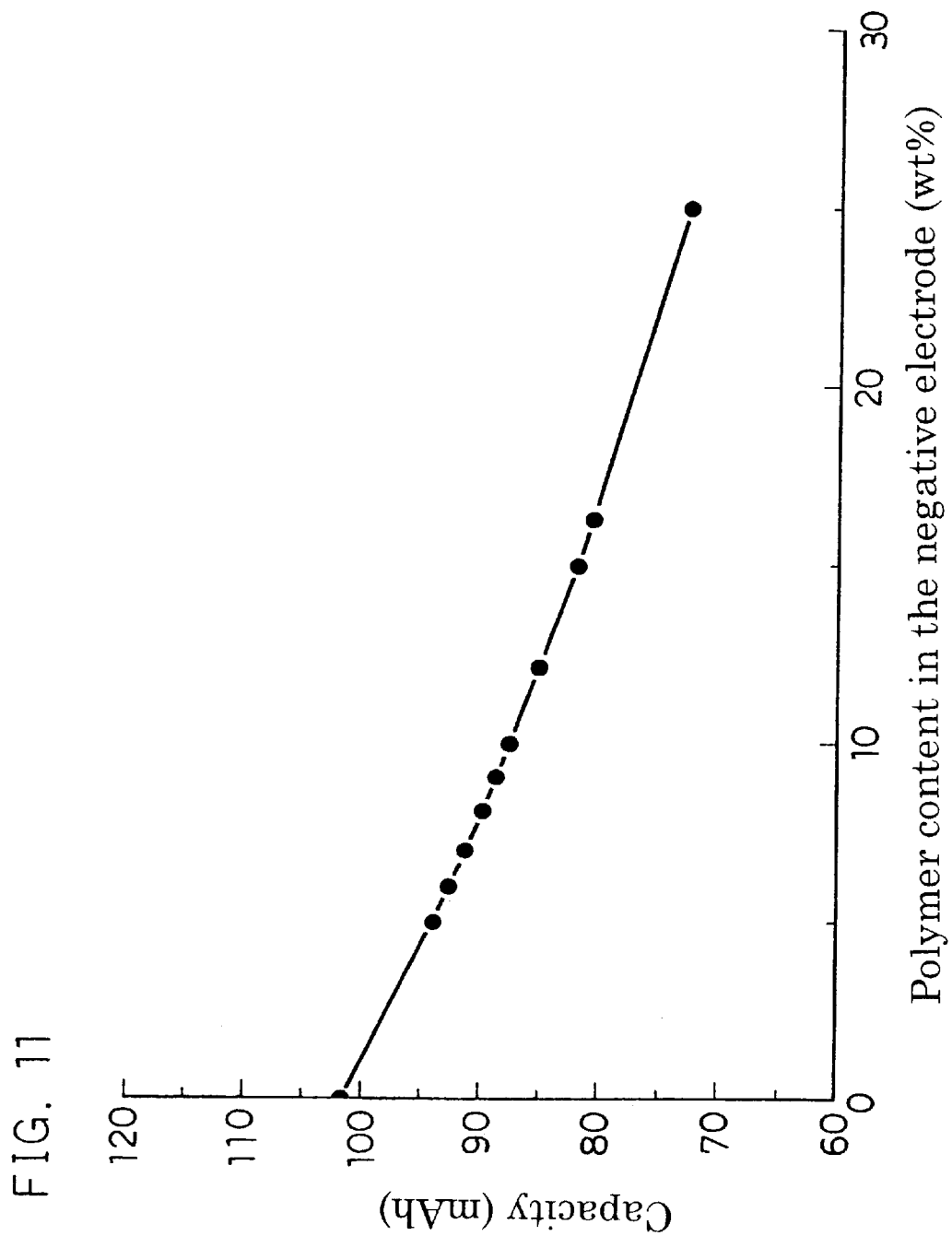
FIG. 11 is a graph illustrating the relationship between the polymer content in the negative electrode and discharge capacity of the resultant battery.

FIG. 10 illustrates discharge capacities in batteries 15 to 23 obtained in a test to discharge at a rate of 0.2 C until the terminal voltage decreased to 3.0 V. FIG. 11 illustrates discharge capacities in batteries 24 to 33 obtained in a similar test.

Figure 12:
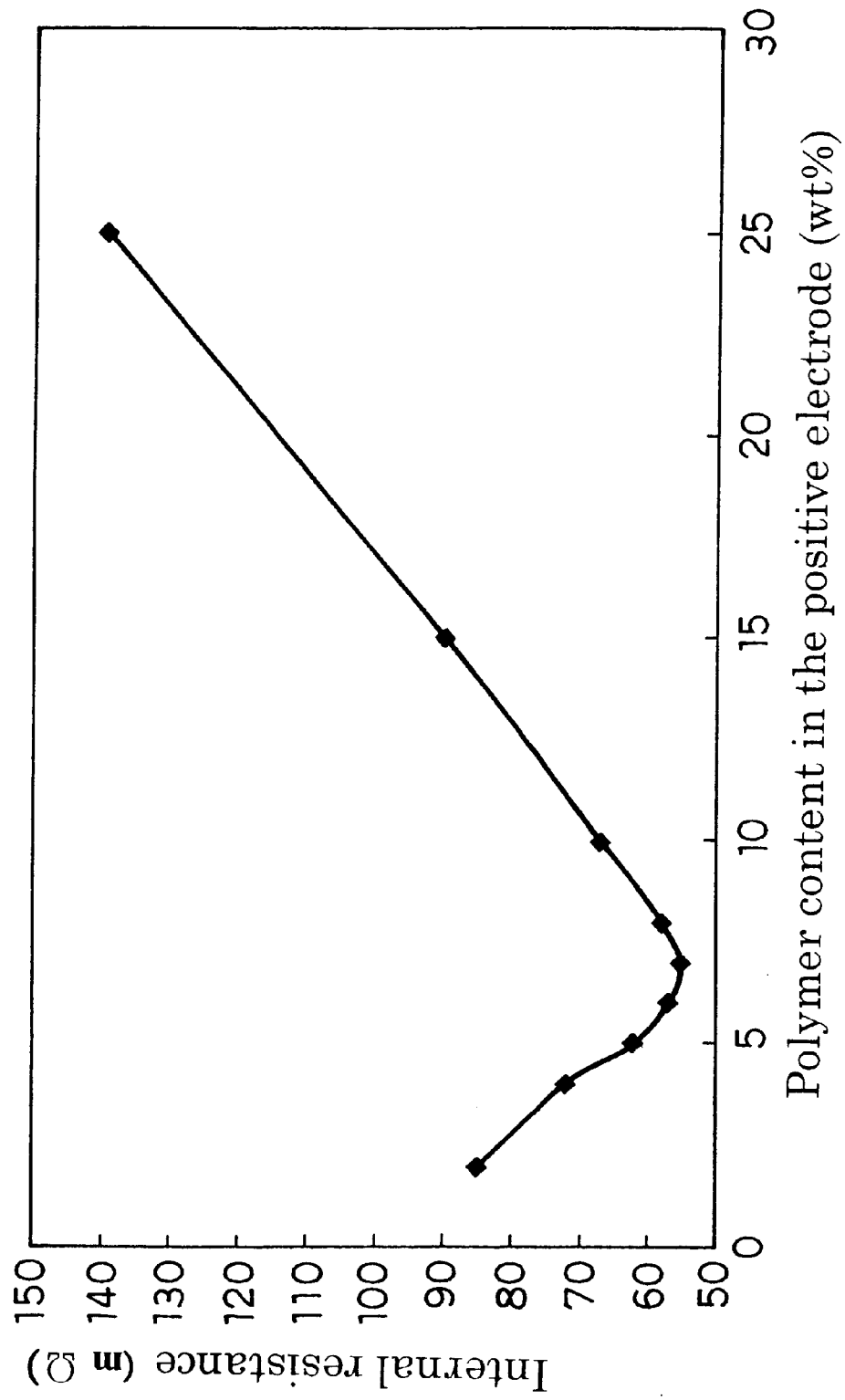
FIG. 12 is a graph illustrating the relationship between the polymer content in the positive electrode and internal resistance in the resultant battery.
Figure 13:
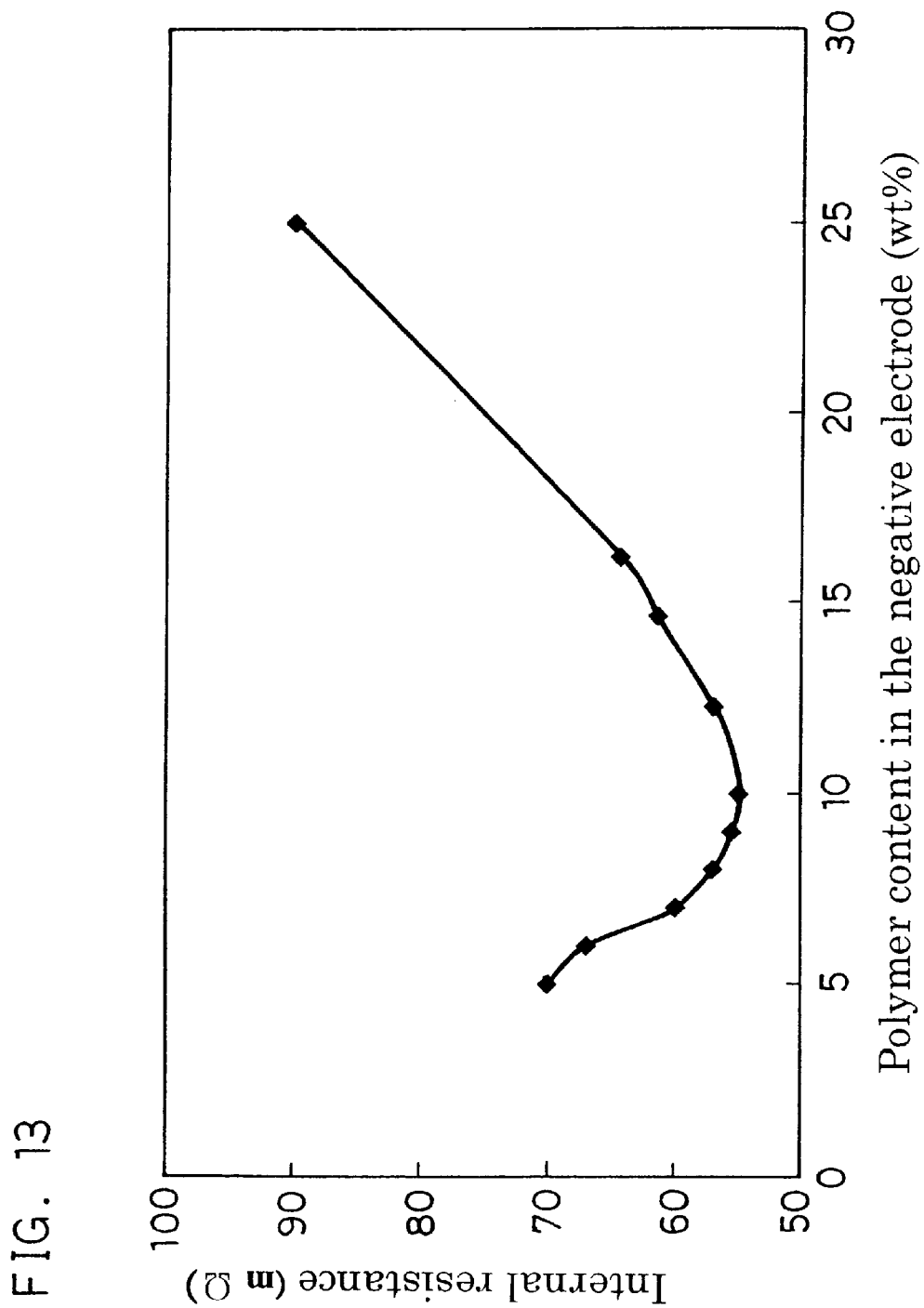
FIG. 13 is a graph illustrating the relationship between the polymer content in the negative electrode and internal resistance in the resultant battery.

Internal resistance was measured in batteries 15 to 23 and batteries 24 to 33 using an AC impedance technique (1 KHz). The results are shown in FIG. 12 and FIG. 13, respectively.

The results indicate that batteries including positive electrodes with a polymer content of 5 to 10 wt % in the layer of active material mixture and negative electrodes with a polymer content of 7 to 16 wt % in the layer of active material mixture can produce good performance. Batteries including positive electrodes with a polymer content of 6 to 8 wt % in the layer of active material mixture and negative electrodes with a polymer content of 8 to 15 wt % in the layer of active material mixture can produce better performance. A battery with best performance is produced with the use of the positive electrode with a polymer content of 7 wt % and the negative electrode with a polymer content of 10 wt %.

As mentioned previously, the present invention can provide a polymer electrolyte battery affording a high current density by optimizing the porosity or polymer content or both in the layer of electrode active material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte battery including: a nonaqueous electrolyte, positive and negative electrode films or sheets, each having a first surface and a second surface, and each of which comprises a porous current collector, the porous current collector also having a first surface and a second surface, wherein a layer of active material mixture is disposed on the first surface and the second surface of said porous current collector, said layer of active material mixture containing a polymer capable of absorbing and retaining said electrolyte and pores formed by at least a pore-forming material, wherein the polymer of the layer of active material mixture is a copolymer of vinylidene fluoride and hexafluoropropylene, and porous separator films of a polymer capable of absorbing and retaining said electrolyte, said electrolyte being retained in said positive and negative electrode films or sheets and in said separator films, wherein said positive electrode films or sheets are unitarily laminated on said negative electrode film or sheet with said separator films being placed on the first surface and the second surface of said negative electrode film or sheet to form a unitary, laminated battery element sheet, and wherein said separator films and said layer of active material mixture of said positive and negative electrode films or sheets have a porosity in a range of 30 to 60%.

2. The polymer electrolyte battery in accordance with claim 1, wherein the porosity of said layer of active material mixture is in a range of 35 to 55% for the positive electrode films or sheets and in a range of 35 to 45% for the negative electrode film or sheet.

3. A polymer electrolyte battery including: a nonaqueous electrolyte, positive electrode films or sheets, each having a first surface and a second surface, and each of which comprises a porous current collector, the porous current collector also having a first surface and a second surface, wherein a layer of active material mixture is disposed on the first surface and the second surface of said porous current collector, said layer of active material mixture containing a polymer, a lithiated transition metal oxide, and pores formed by at least a pore-forming material, a negative electrode film or sheet, having a first surface and a second surface, which comprises a porous current collector, the porous current collector also having a first surface and a second surface, wherein a layer of active material mixture is disposed on the first surface and the second surface of said porous current collector, said layer of active material mixture containing a polymer and a carbon material capable of intercalating and deintercalating lithium upon charge and discharge, wherein the polymer of the layer of active material mixture is a copolymer of vinylidene fluoride and hexafluoropropylene, and porous separator films of a polymer capable of absorbing and retaining said electrolyte, said electrolyte being retained in said positive and negative electrode films or sheets and in said separator films, wherein said positive electrode films or sheets are unitarily laminated on said negative electrode film or sheet with said separator films being placed on the first surface and the second surface of said negative electrode film or sheet to form a unitary, laminated battery element sheet, and wherein said layer of active material mixture of said positive electrode films or sheets has a porosity in a range of 35 to 55%, said layer of active material mixture of said negative electrode film or sheet has a porosity in a range of 35 to 45%, and said separator films have a porosity in a range of 50 to 55%.

4. The polymer electrolyte battery in accordance with claim 3, wherein said carbon material is mainly composed of spheric graphite with a mean particle size of 6 to 50 $\mu$m prepared by carbonizing and graphitizing a carbonaceous mesophase particle.

5. The polymer electrolyte battery in accordance with claim 4, wherein said spheric graphite has an interplanar spacing of 3.365 to 3.390 angstroms and a crystal size of 200 to 650 angstroms along the c axis by X-ray diffractometry, and the $I_{1360}/I_{1580}$ ratio of the peak intensity $I_{1360}$ at 1360 cm$^{-1}$ to the peak intensity $I_{1580}$ at 1580 cm$^{-1}$ by argon laser-Raman spectrometry is in a range of 0.20 to 0.40.

6. A polymer electrolyte battery including: a nonaqueous electrolyte, positive and negative electrode films or sheets, each having a first surface and a second surface, and each of which comprises a porous current collector, the porous current collector also having a first surface and a second surface, wherein a layer of active material mixture is disposed on the first surface and the second surface of said porous current collector, said layer of active material mixture containing a polymer capable of absorbing and retaining said polymer and pores formed by at least a pore-forming material, wherein the polymer of the layer of active material mixture is a copolymer of vinylidene fluoride and hexafluoropropylene, and porous separator films of a polymer capable of absorbing and retaining said electrolyte, said electrolyte being retained in said positive and negative electrode films or sheets, and in said separator films, wherein said positive electrode films or sheets are opposed to said negative electrode film or sheet with said separator films being placed on the first surface and the second surface of said negative electrode film or sheet to form a unitary, laminated battery element sheet, and wherein said layer of active material mixture of said positive electrode films or sheets contains said polymer in a range of 5 to 10 wt % and said layer of active material mixture of said negative electrode film or sheet contains said polymer in a range of 7 to 16 wt %, and the porosity of said layers of active material mixture of each electrode film or sheet is in a range of 35% to 55%.

7. The polymer electrolyte battery in accordance with claim 6, wherein the porosity and polymer content in said layer of active material mixture are in a range of 35 to 55% and 6 to 9 wt % for the positive electrode films or sheets and in a range of 35 to 45% and 8 to 15 wt % for the negative electrode film or sheet, respectively.

8. A polymer electrolyte battery including: a nonaqueous electrolyte, positive electrode films or sheets, each having a first surface and a second surface, and each of which comprises a porous current collector, the porous current collector also having a first surface and a second surface, wherein a layer of active material mixture is disposed on the first surface and the second surface of said porous current collector, said layer of active material mixture containing a polymer, a lithiated transition metal oxide and pores formed by at least a pore-forming material, wherein the polymer of the layer of active material mixture is a copolymer of vinylidene fluoride and hexafluoropropylene, a negative electrode film or sheet, having a first surface and a second surface, which comprises a porous current collector, the porous current collector also having a first surface and a second surface, and a layer of active material mixture disposed on the first surface and the second surface of said porous current collector, said layer of active material mixture containing a polymer and a carbon material capable of intercalating and deintercalating lithium upon charge and discharge, wherein the polymer of the layer of active material mixture is a copolymer of vinylidene fluoride and hexafluoropro[]ylene, and porous separator films of a polymer capable of absorbing and retaining said electrolyte, said electrolyte being retained in said positive and negative electrode films or sheets and in said separator films, wherein said positive electrode films or sheets are unitarily laminated on said negative electrode film or sheet with said separator films being placed on the first surface and the second surface of said negative electrode film or sheet to form a unitary, laminated battery element sheet, and wherein said layer of active material mixture of said positive electrode films or sheets has a porosity of 35% to 55% and contains said polymer in a range of 6 to 8 wt % and said layer of active material mixture of said negative electrode film or sheet has a porosity of 35% to 45% and contains said polymer in a range of 8 to 15 wt %.

9. The polymer electrolyte battery in accordance with claim 8, wherein said carbon material is mainly composed of spheric graphite with a mean particle size of 6 to 50 $\mu$m prepared by carbonizing and graphitizing a carbonaceous mesophase particle.

10. The polymer electrolyte battery in accordance with claim 9, wherein said spheric graphite has an interplanar spacing of 3.365 to 3.390 angstroms and a crystal size of 200 to 650 angstroms along the c axis by X-ray diffractometry, and the $I_{1316}/I_{1580}$ ratio of the peak intensity $I_{1360}$ at 1360 $cm^{-1}$ to the peak intensity $I_{1580}$ at 1580 $cm^{-1}$ by argon laser-Raman spectrometry is in a range of 0.20 to 0.40.

* * * * *